(12) United States Patent
Wang

(10) Patent No.: US 12,486,671 B2
(45) Date of Patent: Dec. 2, 2025

(54) WOODEN NEWEL WITH A CLEAN SURFACE AND PREPARATION METHOD THEREOF

(71) Applicant: Sj industries Inc., Majuro (MH)

(72) Inventor: Kunjie Wang, Fuzhou (CN)

(73) Assignee: Sj industries Inc., Majuro (MH)

( * ) Notice: Subject to any disclaimer, the term of this patent is extended or adjusted under 35 U.S.C. 154(b) by 246 days.

(21) Appl. No.: 18/136,353

(22) Filed: Apr. 19, 2023

(65) Prior Publication Data

US 2024/0167288 A1    May 23, 2024

Related U.S. Application Data

(60) Provisional application No. 63/426,053, filed on Nov. 17, 2022.

(51) Int. Cl.
*E04F 11/18* (2006.01)

(52) U.S. Cl.
CPC ....... *E04F 11/18* (2013.01); *E04F 2011/1887* (2013.01)

(58) Field of Classification Search
CPC .... E04F 11/18; E04F 2011/1887; B32B 21/13
See application file for complete search history.

(56) References Cited

U.S. PATENT DOCUMENTS

| | | | | |
|---|---|---|---|---|
| 904,195 A * | 11/1908 | Gelin | ...................... | E04C 5/161 52/301 |
| 2,824,342 A * | 2/1958 | Hoyle, Jr. | ............... | B63B 15/00 52/843 |
| 6,061,991 A * | 5/2000 | Dahl | ................... | E04F 11/1817 256/21 |
| 6,290,212 B1 * | 9/2001 | Bartel | ................... | E04F 11/181 256/65.14 |
| 6,662,519 B2 * | 12/2003 | Chung | .................... | E04H 12/04 52/832 |
| 2007/0218244 A1 * | 9/2007 | Mak | ........................ | E04F 11/18 428/98 |
| 2008/0102244 A1 * | 5/2008 | Mak | ......................... | B32B 3/02 428/537.1 |
| 2013/0022814 A1 * | 1/2013 | Lin | ........................ | B32B 21/13 428/397 |
| 2020/0102754 A1 * | 4/2020 | Wiebe | ................. | E04F 11/1814 |

FOREIGN PATENT DOCUMENTS

KR          20160064048 A   *   6/2016

* cited by examiner

*Primary Examiner* — Theodore V Adamos
(74) *Attorney, Agent, or Firm* — Bayramoglu Law Offices LLC

(57) ABSTRACT

A wooden newel with a clean surface includes: an inner core; multiple outer wood layers arranged on an outer side surface of the inner core and connected in succession to form a closed structure; and a top wood cover provided on an upper surface or/and a lower surface of the inner core, where the outer wood layer and the top wood cover each are made of a high-grade timber; and the inner core is made of a low-grade timber, a finger-jointed timber or a glued timber. A preparation method for the wooden newel with a clean surface forms the double-layer wooden newel through the inner core and the outer wood layers and prepares the inner core from low-grade timber and the outer wood layers from high-grade timber, so as to reduce the overall cost of the wooden newel and improve the appearance effect of the wooden newel.

8 Claims, 13 Drawing Sheets

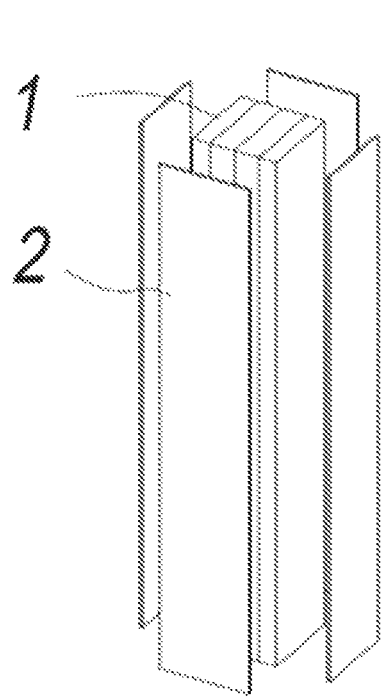 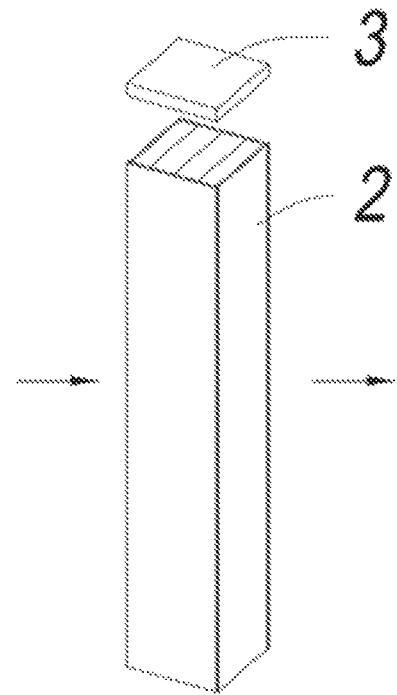 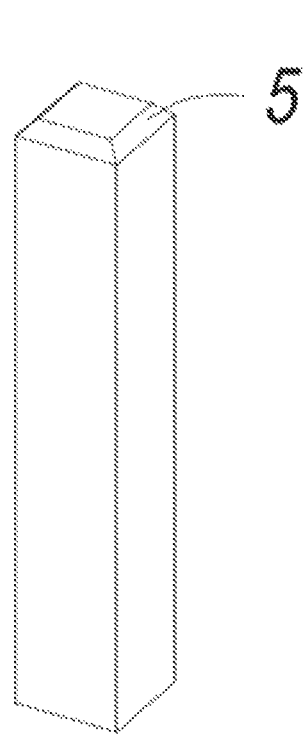
FIG. 10A          FIG. 10B          FIG. 10C
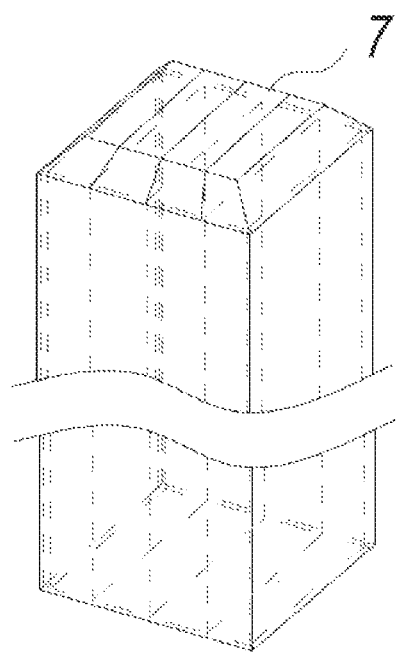
FIG. 11

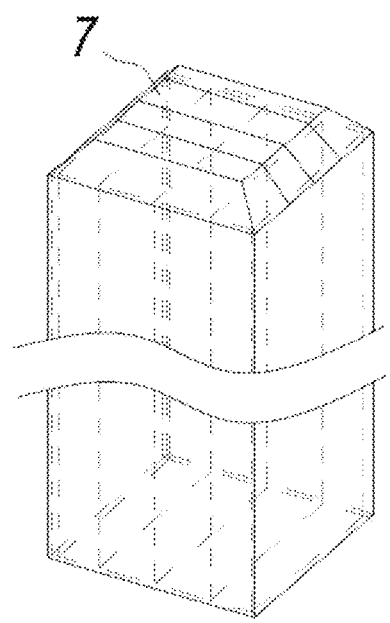
FIG. 12
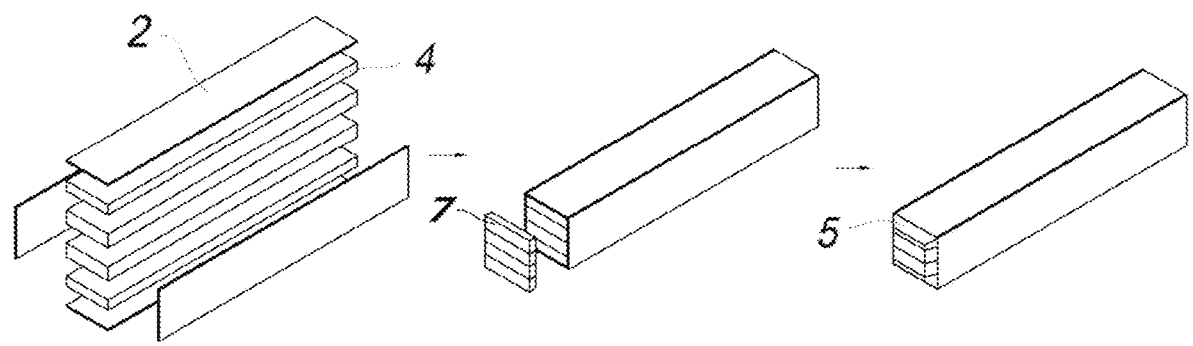
FIG. 13A
FIG. 13B
FIG. 13C

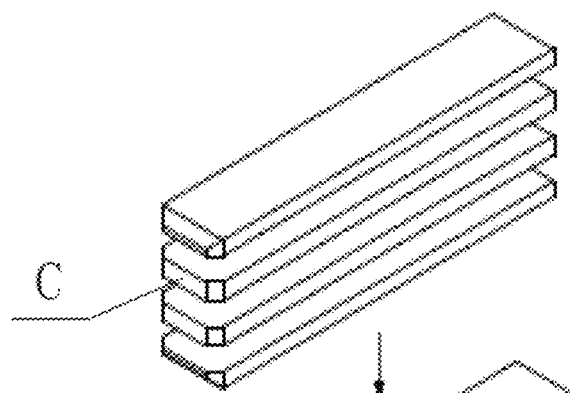
FIG. 15A
FIG. 15B
(Prior Art)
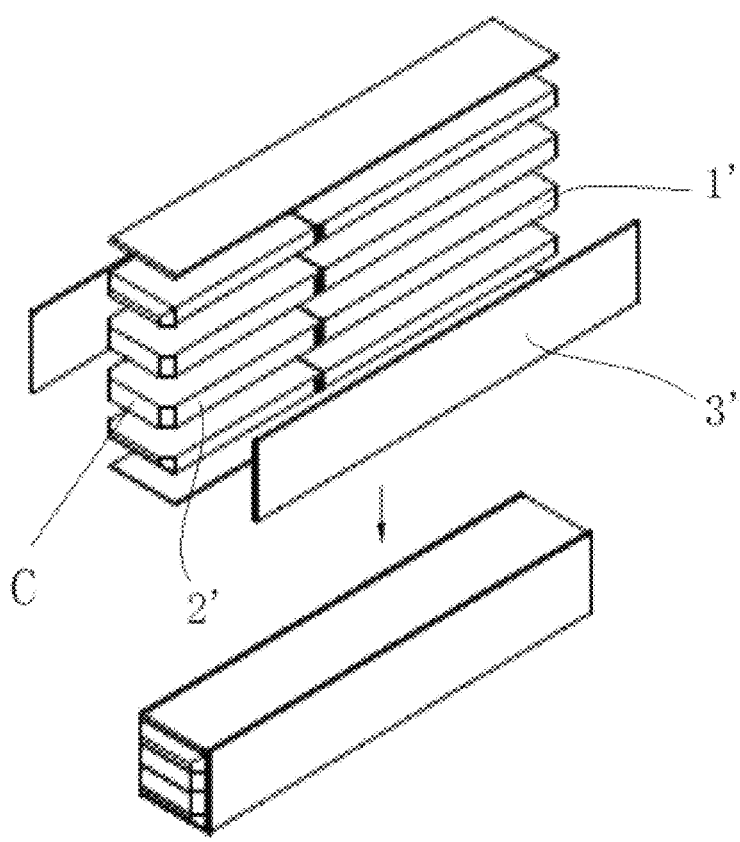
FIG. 16A
FIG. 16B
(Prior Art)

WOODEN NEWEL WITH A CLEAN SURFACE AND PREPARATION METHOD THEREOF

CROSS REFERENCE TO THE RELATED APPLICATIONS

This application is based upon and claims priority to the U.S. Provisional Application No. 63/426,053, filed on Nov. 17, 2022, which is entirely incorporated herein by reference.

TECHNICAL HELD

The present disclosure relates to a wood structure of a building, and in particular, to a wooden newel with a clean surface and a preparation method thereof.

BACKGROUND

According to the existing wood grading in the United States, solid wood is divided into multiple grades: FAS, F1F, SELECT, #1 COM, #2A&2B, #3A COM, #3B COM, and FAS Limitation. A higher grade indicates higher quality and has a higher price. Roughly, there are higher grades (FAS, F1F, SELECT, #1 COM, and #2A&2B) and lower grades (below #3B COM).

In the prior art, the wooden newel is generally formed by splicing multiple pieces of high-grade wood. As shown in FIGS. 15A-15B, the structure is all made of high-grade wood, resulting in high costs and serious wood waste. In addition, the upper surface C (i.e., the truncated surface of the wood) is exposed. As a result, the wood pores on the truncated surface will absorb and release water, resulting in a change in the moisture content, thus leading to quality problems such as cracking.

In the prior art, low-grade wood is typically used to reduce the cost of the wooden newel. As shown in FIGS. 16A-16B, the inner core of the wooden newel is formed by connecting four low-grade timbers (or finger-jointed timbers or glued timbers) 1' and four high-grade timbers 2', and covering the outer part of the wooden newel with an A-level wood sheet 3'. The production cost of the wooden newel is reduced due to the use of low-grade timbers (or finger-jointed timbers or glued timbers). However, the proportion of high-grade timbers in the wooden newel is still very high. In addition, the top surface C is a truncated surface showing the wood grain different from that of the external wood sheet, which affects the appearance of the wooden newel. The wood pores on the truncated surface of the wooden newel will absorb and release water, resulting in a change in the moisture content, thus leading to quality problems such as cracking.

SUMMARY

An objective of the present disclosure is to provide a wooden newel with a clean surface and a preparation method thereof, so as to significantly reduce the production cost and prevent the wooden newel from cracking due to the change in moisture content.

To achieve the above objective, the present disclosure adopts the following technical solutions:

The wooden newel with a clean surface includes: an inner core; multiple outer wood layers arranged on an outer side surface of the inner core and connected in succession to form a closed structure; and a top wood cover provided on an upper surface or/and a lower surface of the inner core, where the outer wood layer and the top wood cover each are made of a high-grade timber; and the inner core is made of a low-grade timber, a finger-jointed timber or a glued timber.

Preferably, the top wood cover is provided on an upper surface of the inner core and an upper surface of the outer wood layer; and the top wood cover is provided with a chamfer or fillet.

Preferably, the top wood cover is provided on an upper surface of the inner core, and is located on an inner side of the outer wood layer; and the top wood cover and the outer wood layer each are provided with a chamfer or fillet.

Further, an angle between the chamfer and a horizontal plane is 40-60'.

Further, the inner core is formed by connecting multiple wood planks by means of bonding, mortise and tenon joint, bolt connection, or tooth connection.

The inner core is formed by multiple wood planks that are longitudinally arranged and connected.

A wood grain on the outer wood layer and a wood grain on the wood plank extend longitudinally.

In some embodiments, the top wood cover is formed by splicing multiple wood battens.

Preferably, the outer wood layer is a wood sheet.

The present disclosure further provides a preparation method for a wooden newel with a clean surface, including the following steps:

A1: preparing an inner core;

A2: fixing a top wood cover to an upper surface of the inner core, and allowing an outer side surface of the top wood cover to be flush with an outer side surface of the inner core; and A3: fixing multiple outer wood layers to the outer side surface of the inner core and the outer side surface of the top wood cover; and connecting the multiple outer wood layers in succession to form a closed structure, such that the outer side surface of the inner core and the outer side surface of the top wood cover are completely covered by the outer wood layers to form an overall structure.

Further, the preparation method includes step A4: chamfering or filleting an edge of an upper surface of the overall structure formed in step A3.

The preparing an inner core includes: preparing the inner core from a low-grade timber, a finger-jointed timber, or a glued timber; or preparing the inner core by connecting multiple low-grade timbers, multiple finger-jointed timbers, or multiple glued timbers.

The present disclosure further provides another preparation method of a wooden newel with a clean surface, including the following steps:

B1: preparing an inner core;

B2: fixing multiple outer wood layers to an outer side surface of the inner core; and connecting the multiple outer wood layers in succession to form a closed structure, such that the outer side surface of the inner core is completely covered by the outer wood layers, where an upper surface of the outer wood layer is flush with an upper surface of the inner core; and B3: fixing a top wood cover to the upper surface of the inner core and the upper surface of the outer wood layer.

Preferably, the top wood cover is provided with a chamfer or fillet.

The preparing an inner core includes: preparing the inner core from a low-grade timber, a finger-jointed timber, or a glued timber; or preparing the inner core by connecting multiple low-grade timbers, multiple finger-jointed timbers, or multiple glued timbers.

With the above structure, the present disclosure has the following beneficial effects:

1. The present disclosure forms the double-layer wooden newel through the inner core and the outer wood layers. The present disclosure prepares the inner core from a low-grade timber and the outer wood layers from a high-grade timber, so as to reduce the overall cost of the wooden newel and improve the appearance effect of the wooden newel.
2. The present disclosure covers the inner core with the outer wood layers and the top wood cover to avoid exposing the truncated surface of the wood. Therefore, the present disclosure realizes a clean surface and can prevent quality problems such as cracking caused by the change of moisture content due to water absorption and release of the wood.

BRIEF DESCRIPTION OF THE DRAWINGS

FIGS. 10A-10C show a process of a preparation method according to Embodiment 2 of the present disclosure;

FIG. 11 is a schematic diagram of a wooden newel, where a top wood cover has a spliced structure spliced in a same splicing direction as wood planks;

FIG. 12 is a schematic diagram of a wooden newel, where a top wood cover has a spliced structure spliced in a splicing direction perpendicular to that of wood planks;

FIGS. 13A-13C are schematic diagrams of a preparation method of a wooden newel with a spliced top wood cover;

FIGS. 15A-15B are schematic diagrams of a wooden newel mentioned in the prior art; and FIGS. 16A-16B are schematic diagrams of another wooden newel mentioned in the prior art.

REFERENCE NUMERALS

1. inner core; 2. outer wood layer; 3. top wood cover; 4. wood plank; 5. chamfer; 6. wood grain; and 7. wood batten.

DETAILED DESCRIPTION OF THE EMBODIMENTS

To help those skilled in the art to better understand the technical solutions of the present disclosure, the present disclosure will be further described in detail below with reference to the drawings and specific embodiments.

Embodiment 1

Figure 1:
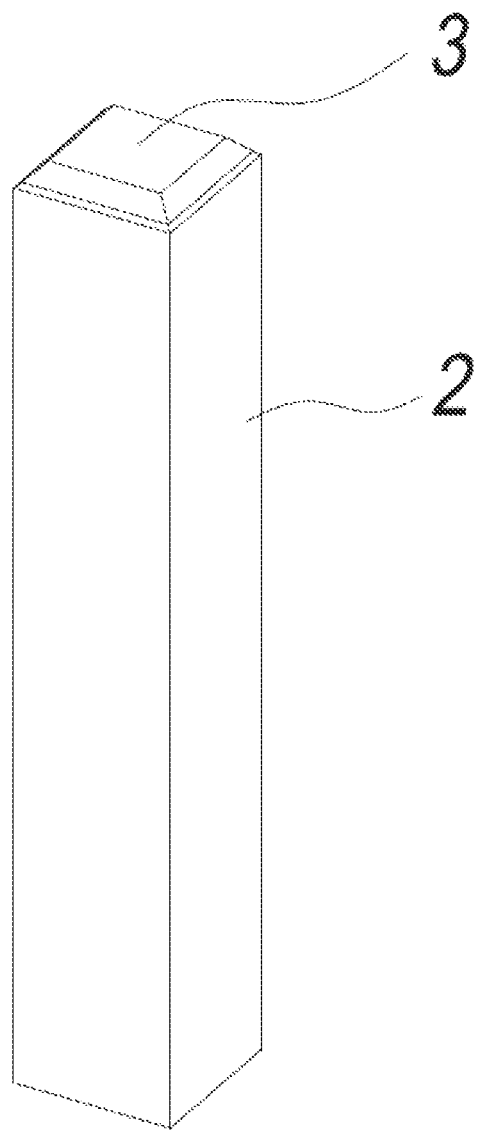
FIG. 1 is a structural diagram of a wooden newel with a clean surface according to Embodiment 1 of the present disclosure.
Figure 2:
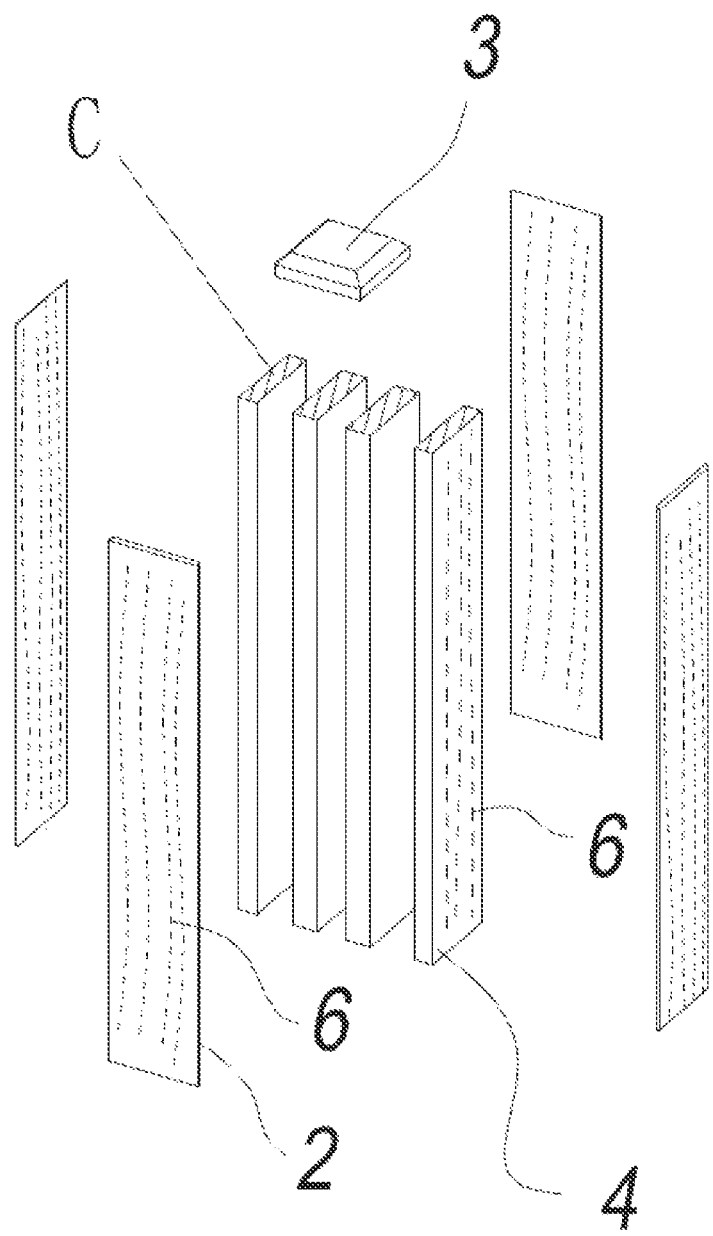
FIG. 2 is an exploded view of the wooden newel shown in FIG. 1.

As shown in FIG. 1, this embodiment provides a wooden newel with a clean surface, including inner core 1, multiple outer wood layers 2, and top wood cover 3. The inner core 1 is made of a low-grade timber. As shown in FIG. 2, in this embodiment, the inner core 1 includes four wood planks 4, which are made of a low-grade timber and are longitudinally arranged and bonded together or fixed by a connector. The inner core can also be formed by a single wood core, or by multiple wood cores that are longitudinally arranged and bonded or fixed by a connector. The longitudinal arrangement improves the longitudinal stress strength of the inner core 1. In other embodiments, the wood plank can also be made of a finger-jointed timber or a glued timber made of wood scraps. The inner core 1 is made of wood scraps, which effectively improves resource utilization. In this embodiment, the inner core 1 has a rectangular truncated surface.

The multiple outer wood layers 2 are arranged on an outer side surface of the inner core 1. The outer wood layers 2 are made of a high-grade timber. In this embodiment, the high-grade timber is cut into four outer wood layers 2, and the outer wood layers 2 are wood sheets. In other embodiments, the outer wood layers 2 can also be designed as an outer structure with a certain shape as required. The four outer wood layers 2 are connected in succession to form a closed structure.

The top wood cover 3 is provided on an upper surface or a lower surface of the inner core 1, or two top wood covers 3 are arranged on the upper and lower surfaces of the inner core, respectively. The top wood cover is designed according to the use scenario of the wooden newel. The wooden newel is usually installed on the ground. Therefore, it is not necessary to provide a top wood cover 3 on the lower surface of the wooden newel, but only on the upper surface of the wooden newel. The top wood cover 3 and the outer wood layer 2 have consistent wood grains, and they are made of a higher-grade timber than the inner core 1. As the wood grain of the top wood cover 3 is consistent with that of the outer wood layer 2, the appearance of the wooden newel is uniform and beautiful.

According to the wood grading in the United States, the top wood cover 3 and the outer wood layers 2 are made of high-grade timbers such as FAS, F1F, SELECT, #1 COM, or #2A&2B timbers, and the inner core 1 is made of a low-grade timber such as #3B COM or below timber. A higher grade indicates higher quality and has a higher price. In some embodiments, the inner core can also be made of a finger-jointed timber or a glued timber. The high-grade wood can be selected from oakwood, maple wood, poplar wood, cherry wood, beech wood, alder wood, and hemlock wood. The low-grade wood can be selected from rubber wood, pinewood, cedar wood, defective high-quality wood, and high-density fiber material. The wood consumption of the top wood cover 3 and the outer wood layers 2 is very low, and the inner core 1 is made of a large number of cheap low-grade timbers (or finger-jointed timbers). Therefore, the wooden newel of the present disclosure greatly saves the cost. The top wood cover 3 and the outer wood layers 2 on the outer side surface of the wooden newel are made of a high-quality high-grade timber, which can avoid exposing the low-grade timber (or finger-jointed timber or glued timber), thus improving the appearance effect of the wooden newel. The top wood cover 3 and the outer wood layers 2 are wood texture surfaces, which can avoid the exposure of the truncated surface of the wood with pores (the surface C in FIG. 2), and prevent cracking and other quality problems caused by the change of moisture content due to water absorption and release of the wood.

Figure 3:
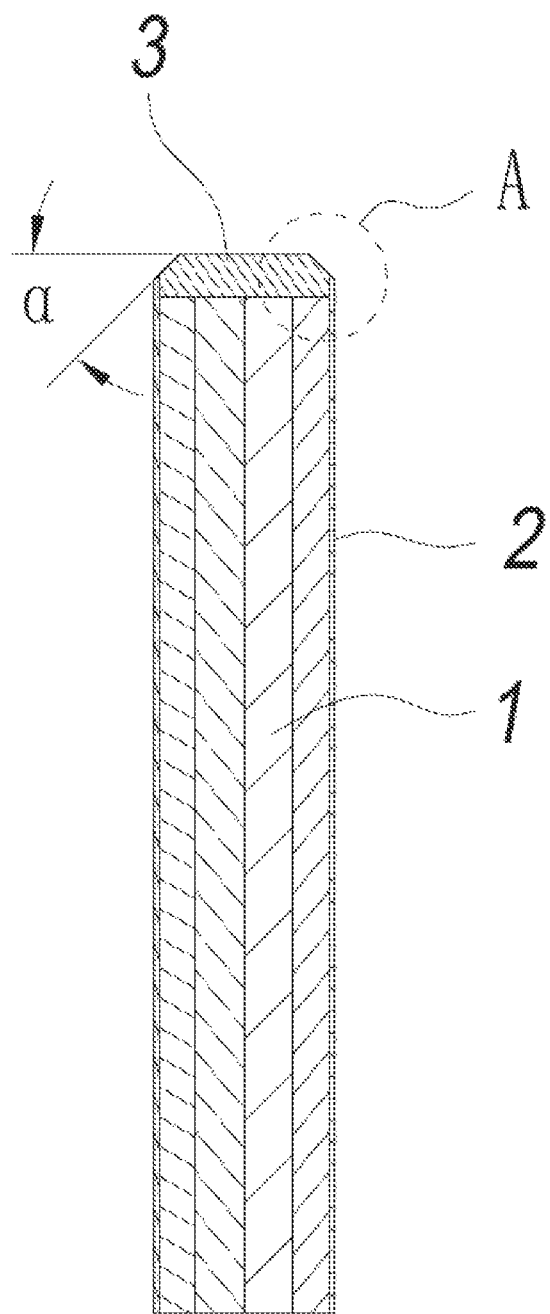
FIG. 3 is a sectional view of the wooden newel shown in FIG. 1.
Figure 4:
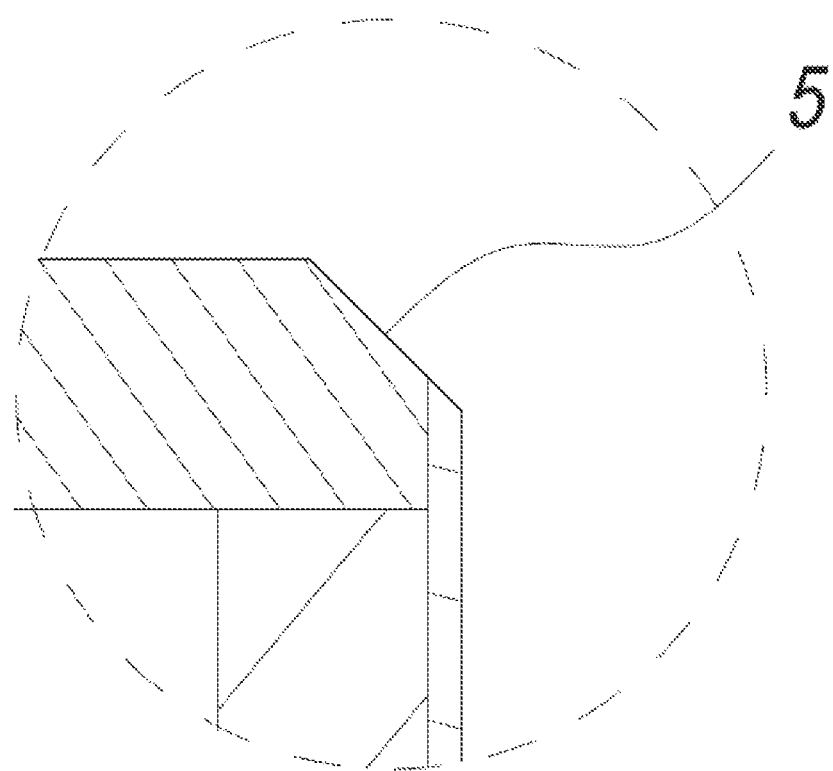
FIG. 4 is an enlarged view of A shown in FIG. 3.

As shown in FIG. 3 and FIG. 4, in this embodiment, the top wood cover 3 is provided on the upper surface of the inner core 1 and the inner side of the outer wood layer 2. The top wood cover 3 and the outer wood layer 2 each are provided with chamfer 5 or fillet. An angle α between the chamfer 5 and a horizontal plane is 40-60°, In this embodiment, α=45°.

Figure 5A:
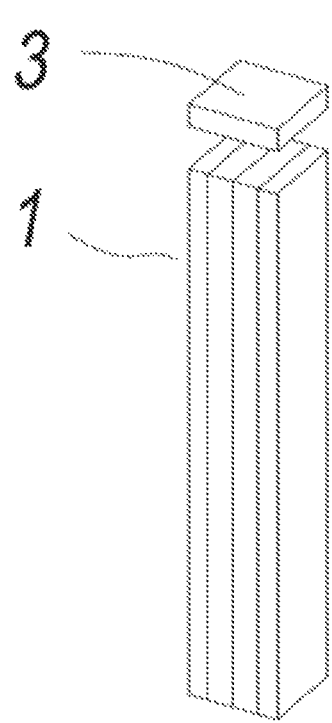
FIGS. 5A-5C show a process of a preparation method according to Embodiment 1 of the present disclosure.
Figure 5B:
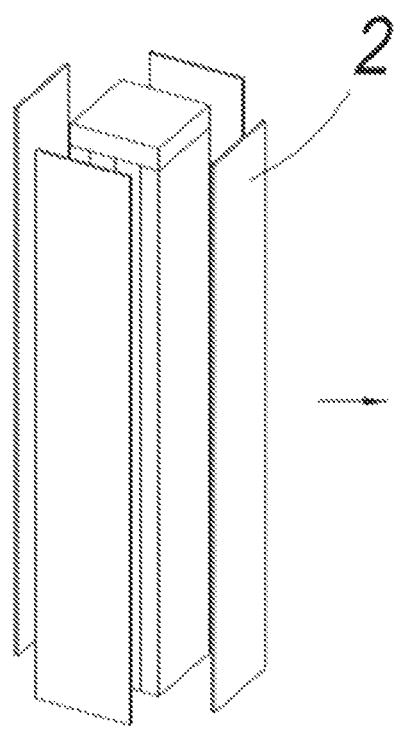
Figure 5C:
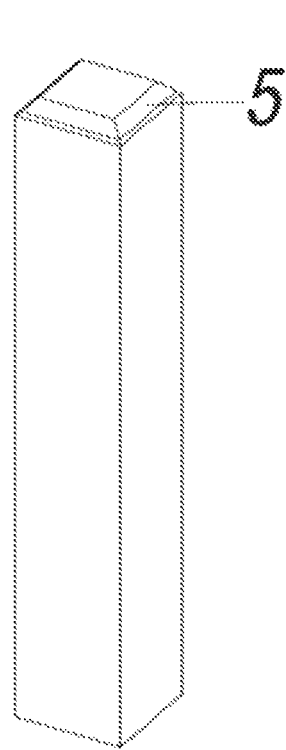

As shown in FIGS. 5A-5C, this embodiment further provides a preparation method for a wooden newel with a clean surface, including the following steps:

A1. As shown in FIG. 5A, one or more wood planks 4 are arranged and connected to form inner core 1. There are many connection methods for the wood planks 4, such as bonding, mortise and tenon joint, bolt connection, and tooth connection. The wood planks 4 can be arranged vertically, horizontally, or irregularly, A shape of the inner core 1 is set according to the final shape of the wooden newel, and it may be a cuboid or a polygon prism.

A2. A top wood cover 3 is fixed to an upper surface of the inner core 1, and an outer side surface of the top wood cover 3 is flush with an outer side surface of the inner core 1, so as to cover multiple outer wood layers 2 in a subsequent step.

A3. A high-grade timber is cut into four outer wood layers 2 and the top wood cover 3. In order to improve the stress reliability of the wooden newel, the high-grade timber is cut along a longitudinal texture direction to form the four outer wood layers 2. As shown in FIG. 2, the outer wood layers 2 and the wood planks 4 are arranged longitudinally, and a wood grain 6 extends longitudinally. Because the wood grain 6 is along the longitudinal direction, the wooden newel has high tensile and compressive strength.

As shown in FIG. 5B, the outer wood layers 2 are fixed to the outer side surfaces of the inner core 1 and the top wood cover 3. The four outer wood layers 2 are connected in succession to form a closed quadrilateral, such that the outer side surfaces of the inner core 1 and the top wood cover 3 are completely covered by the outer wood layers 2 to form an overall structure. Because the outer side surfaces of the inner core 1 and the top wood cover 3 are completely covered by the outer wood layers 2, the wooden newel can prevent cracking and other quality problems caused by the change of moisture content due to water absorption and release, A4. As shown in FIG. 5C, an edge of an upper surface of the overall structure formed in step A3 is chamfered, so as to form a structure with chamfer 5 shown in FIG. 4.

In this embodiment, the chamfering is carried out after the outer side surfaces of the inner core 1 and the top wood cover 3 are completely covered by the outer wood layers 2, and there is no gap between the top wood cover 3 and the outer wood layers 2. The design realizes close adhesion and can prevent the inner core from absorbing water and releasing water to cause cracking.

Embodiment 2

Figure 6:
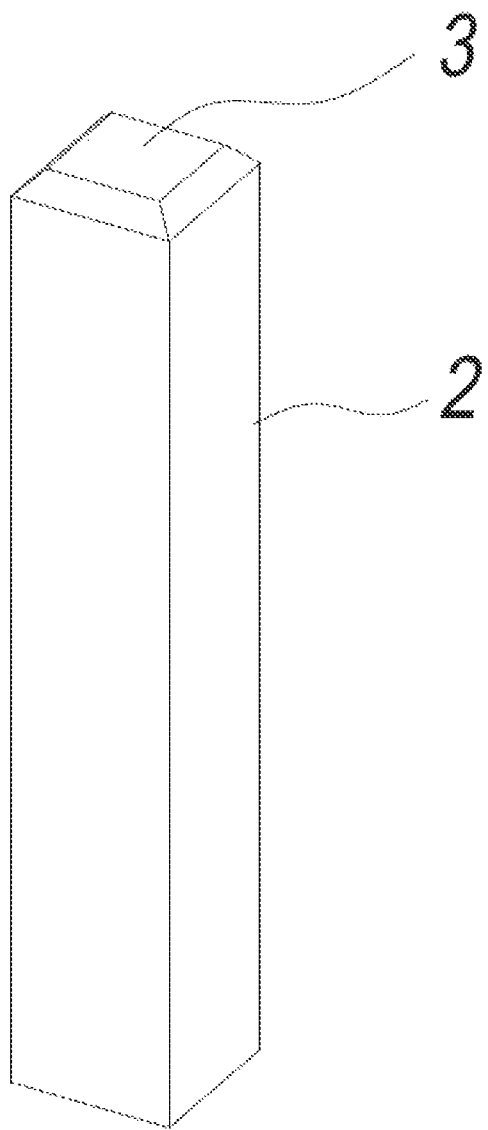
FIG. 6 is a structural diagram of a wooden newel with a clean surface according to Embodiment 2 of the present disclosure.
Figure 7:
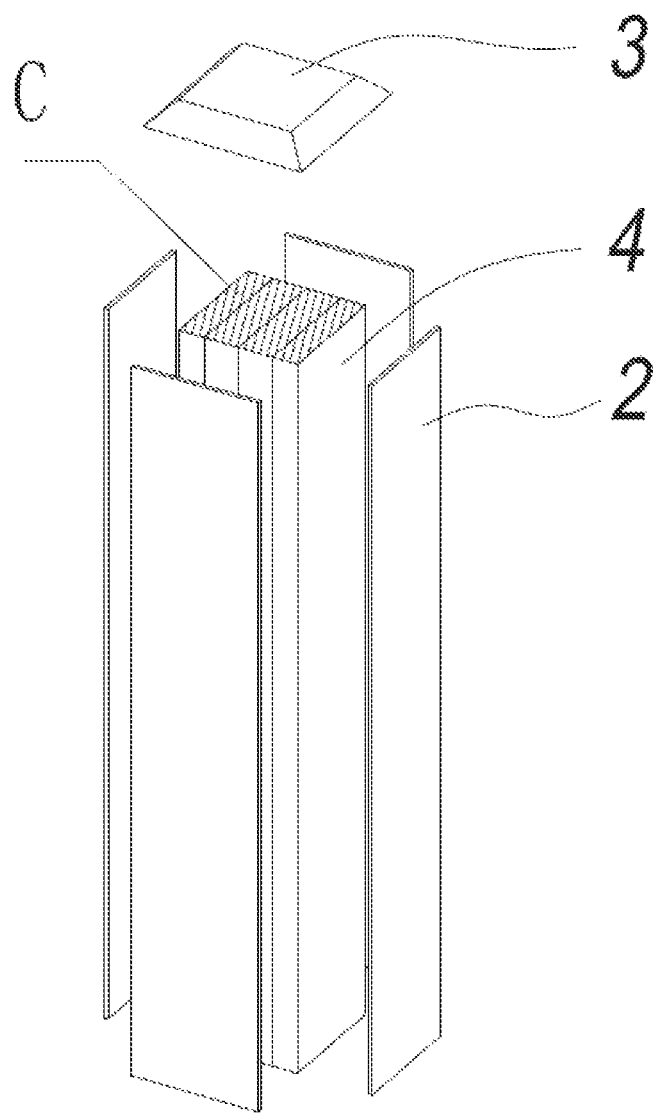
FIG. 7 is an exploded view of the wooden newel shown in FIG. 6.

As shown in FIG. 6, this embodiment provides a wooden newel with a clean surface, including inner core 1, multiple outer wood layers 2, and top wood cover 3. The inner core 1 is formed by one or more wood planks 4 that are connected together. The inner core 1 is made of a low-grade timber or finger-jointed timber. As shown in FIG. 7, in this embodiment, the inner core 1 is formed by four wood planks 4 made of a low-grade timber. In other embodiments, the inner core 1 can also be made of a finger jointed timber or a glued timber made of wood scraps, so as to improve resource utilization.

There are four outer wood layers 2 arranged on an outer side surface of the inner core 1. In this embodiment, a high-grade timber is cut into the four outer wood layers 2. The four outer wood layers 2 are connected in succession to form a closed structure.

The top wood cover 3 is provided on an upper surface of the inner core 1. The top wood cover 3 is made of a higher-grade timber than the inner core. As shown in FIGS. 10A-10C, the top wood cover 3 is a thin wood sheet. As shown in FIG. 11, the top wood cover 3 can also be formed by splicing multiple wood battens 7. The splicing direction of the wood battens 7 and the splicing direction of the wood planks 4 can be the same or different. As shown in FIG. 11, the splicing direction of the four wood battens 7 is the same as that of the four wood planks 4 of the inner core 1. As shown in FIG. 12, the splicing direction of the four wood battens 7 is perpendicular to the splicing direction of the four wood planks 4, which can achieve a more robust structure.

Figure 8:
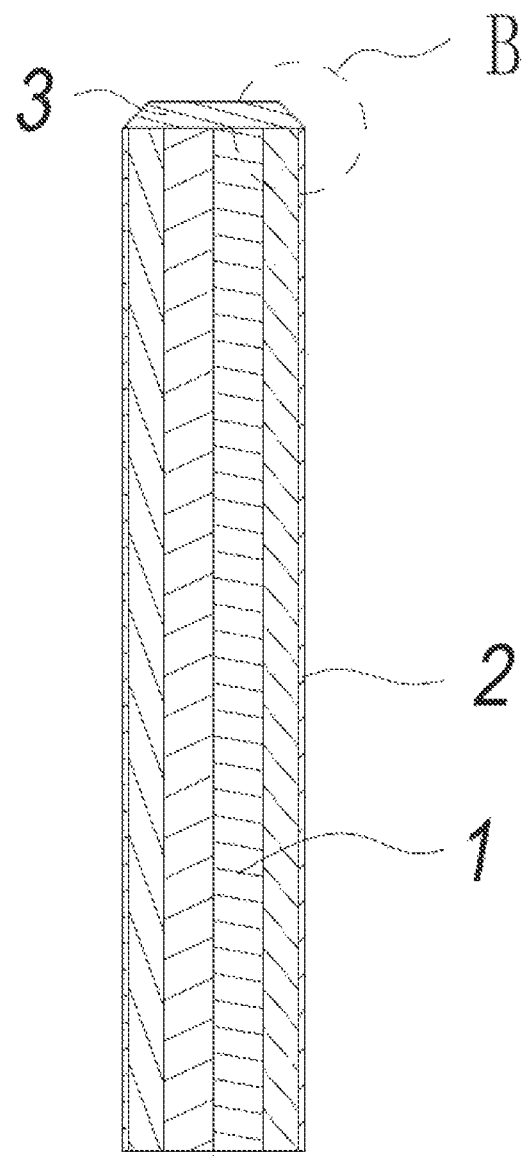
FIG. 8 is a sectional view of the wooden newel shown in FIG. 6.
Figure 9:
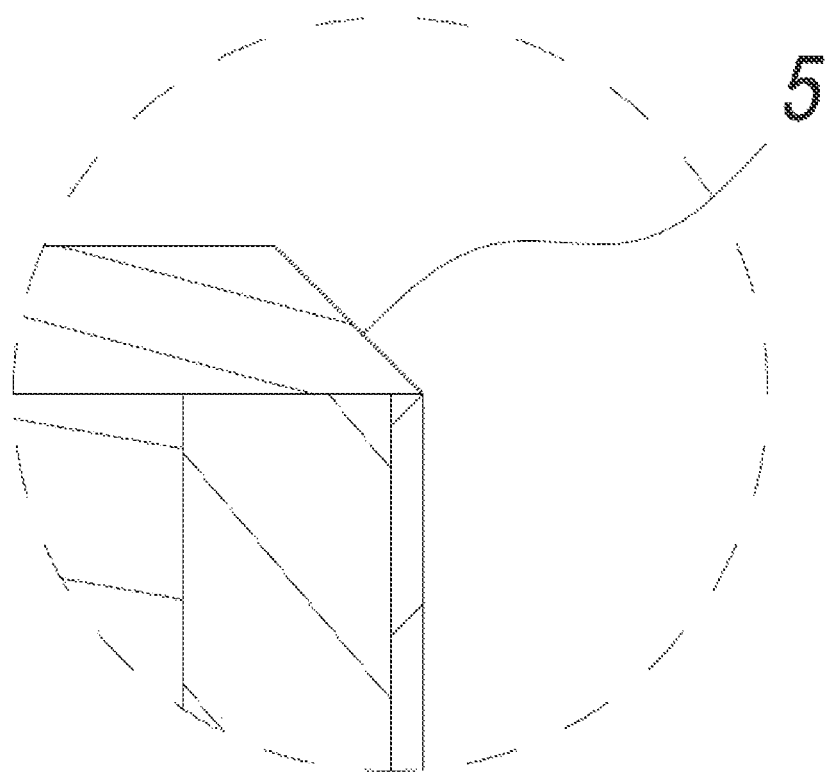
FIG. 9 is an enlarged view of B shown in FIG. 8.

As shown in FIG. 8 and FIG. 9, in this embodiment, the top wood cover 3 is provided on the upper surfaces of the inner core 1 and the outer wood layer 2, and the overall surface is more beautiful. The top wood cover 3 is provided with a chamfer 5 or fillet. An angle between the chamfer 5 and a horizontal plane is 40-60°.

As shown in FIGS. 10A-10C, this embodiment provides a preparation method of a wooden newel with a clean surface, including the following steps:

B1. As shown in FIG. 10A, one or more wood planks 4 are arranged and connected to form inner core 1. There are many connection methods for the wood planks 4, such as bonding, mortise and tenon joint, bolt connection, and tooth connection. The wood planks 4 can be arranged vertically, horizontally, or irregularly. A shape of the inner core 1 is set according to a final shape of the wooden newel, and it may be a cuboid or a polygon prism.

B2. Four outer wood layers 2 are fixed to an outer side surface of the inner core 1. The four outer wood layers 2 are connected in succession to form a closed structure, such that the outer side surface of the inner core 1 is completely covered by the outer wood layers 2, where an upper surface of the outer wood layer 2 is flush with an upper surface of the inner core 1. The upper surface of the outer wood layer 2 is flush with the upper surface of the inner core 1, so as to facilitate the installation of the top wood cover 3 in a subsequent step.

B3. As shown in FIG. 10B, the top wood cover 3 is fixed to the upper surface of the inner core 1 and the upper surface of the outer wood layer 2.

As shown in FIGS. 13A-13C, when the top wood cover 3 is formed by splicing four wood battens 7, the four wood battens 7 are first spliced to form the top wood cover 3, and then the top wood cover 3 is fixed to the upper surfaces of the inner core 1 and the outer wood layer 2.

Figure 14:
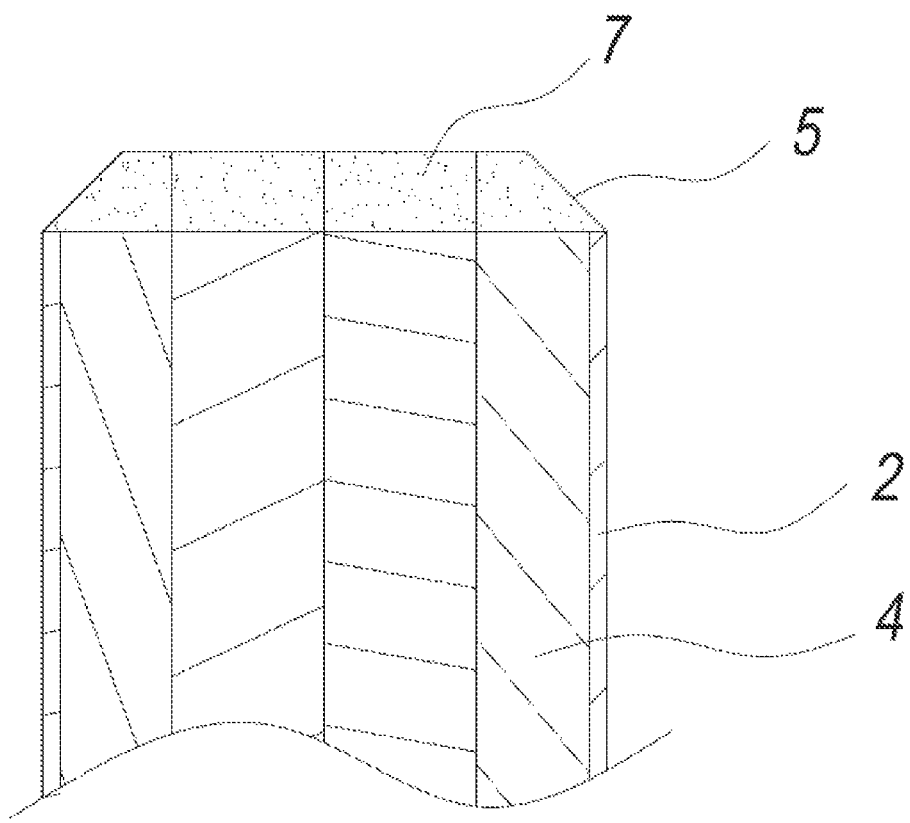
FIG. 14 is a sectional view of the wooden newel with a spliced top wood cover.

B4. The top wood cover 3 is chamfered so as to form a structure with chamfer 5 shown in FIG. 9. The top wood cover 3 is formed by splicing four wood battens 7 so as to form a structure with chamfer 5 shown in FIG. 14.

Compared with Embodiment 1, in this embodiment, the chamfer 5 is completely provided on the top wood cover 3, and the upper surface of the wooden newel does not expose the outer wood layers 2, so the surface of the wooden newel is more beautiful.

The wooden newel prepared by the method of the present disclosure features a solid structure, high stability, consistent appearance and texture, low cost, and high cost performance, and can prevent the inner core from cracking due to the change of moisture content.

The above described are merely preferred specific implementations of the present disclosure, but the protection scope of the present disclosure is not limited thereto. Any modification or replacement easily conceived by those skilled in the art within the technical scope of the present disclosure should fall within the protection scope of the present disclosure.

What is claimed is:

1. A wooden newel with a clean surface, comprising:
   an inner core;
   multiple outer wood layers arranged on an outer side surface of the inner core, wherein the multiple outer wood layers are connected in succession to form a closed structure; and
   a top wood cover provided on an upper surface or/and a lower surface of the inner core;
   wherein, the multiple outer wood layers and the top wood cover are made of a high-grade timber; and the inner core is made of a low-grade timber, a finger-jointed timber, or a glued timber, wherein the top wood cover comprises a cap having a continuous chamfer that extends along an upper surface of the top wood cover from a central apex of the top wood cover to a bottom surface of the top wood cover in one direction, and wherein the top wood cover is uniformly chamfered, and wherein the top wood cover is provided on an upper surface of the inner core and an upper surface of the multiple outer wood layers.

2. The wooden newel with a clean surface according to claim 1, wherein an angle between the chamfer and a horizontal plane is 40-60°.

3. The wooden newel with a clean surface according to claim 1, wherein the inner core is formed by connecting multiple wood planks through bonding, mortise and tenon joint, bolt connection, or tooth connection.

4. The wooden newel with a clean surface according to claim 3, wherein the inner core is formed by the multiple wood planks that are longitudinally arranged and connected.

5. The wooden newel with a clean surface according to claim 4, wherein a wood grain on the multiple outer wood layers and a wood grain on the multiple wood planks extend longitudinally.

6. The wooden newel with a clean surface according to claim 1, wherein each of the multiple outer wood layer is a wood sheet.

7. A preparation method of a wooden newel with a clean surface, comprising the following steps:
   B1: preparing an inner core;
   B2: fixing multiple outer wood layers to an outer side surface of the inner core; and connecting the multiple outer wood layers in succession to form a closed structure, such that the outer side surface of the inner core is completely covered by the multiple outer wood layers, wherein an upper surface of the multiple outer wood layers is flush with an upper surface of the inner core;
   B3: fixing a top wood cover to the upper surface of the inner core and the upper surface of the multiple outer wood layers;
   B4: chamfering the top wood cover that extends along an upper surface of the top wood cover from a central apex of the top wood cover to a bottom surface of the top wood cover in one direction such that the top wood cover is uniformly chamfered; and
   covering an upper surface of the inner core and an upper surface of the multiple outer wood layer with the top wood cover.

8. The preparation method of a wooden newel with a clean surface according to claim 7, wherein the step B1 includes: using a low-grade timber, a finger-jointed timber, or a glued timber to form the inner core; or connecting multiple low-grade timbers, multiple finger-jointed timbers or multiple glued timbers to form the inner core.

* * * * *